Dec. 4, 1951 J. D. WALKER 2,577,095
APPARATUS FOR DISPERSING MATERIAL IN A FLUID STREAM
Filed Oct. 25, 1946 2 SHEETS—SHEET 1
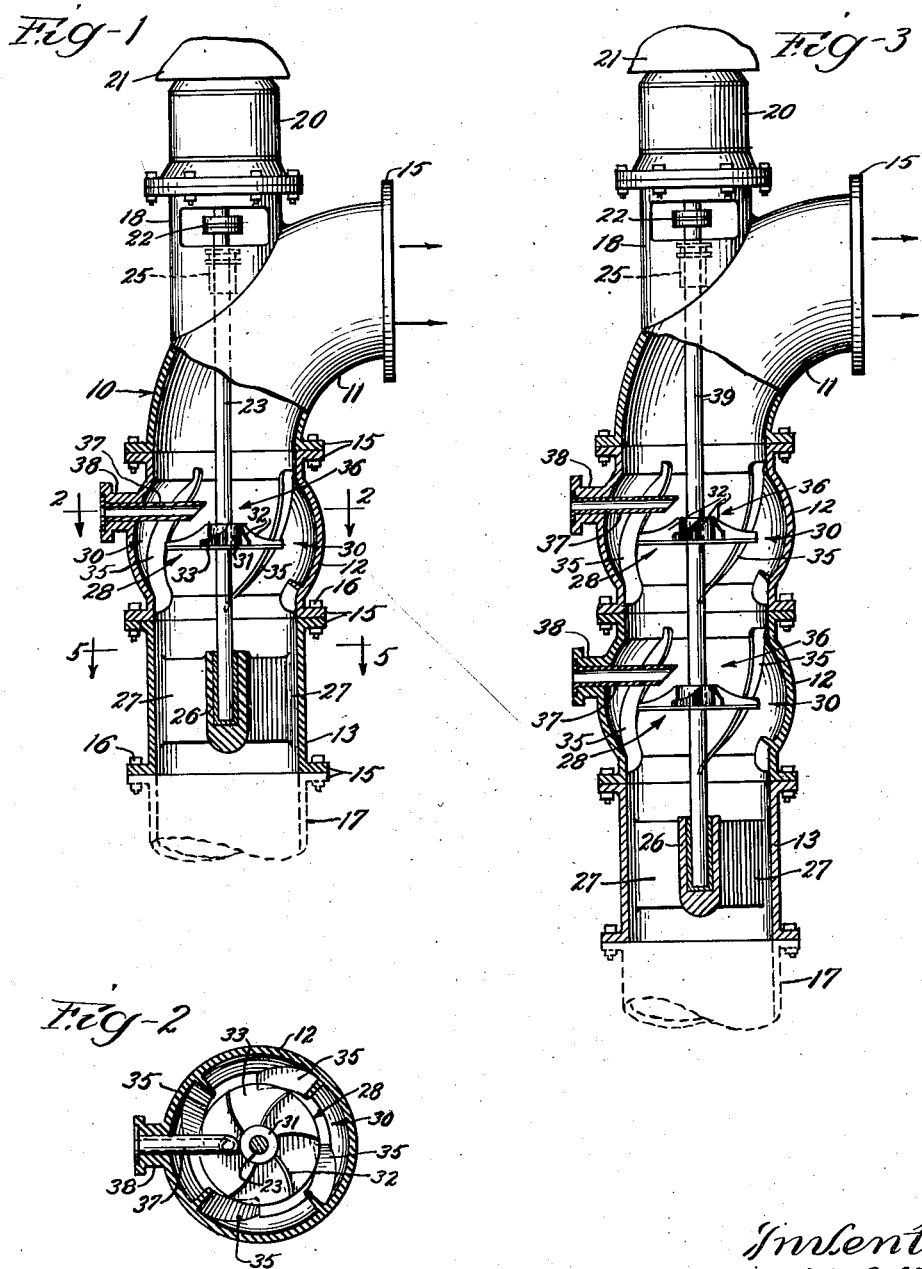

Dec. 4, 1951          J. D. WALKER          2,577,095
APPARATUS FOR DISPERSING MATERIAL IN A FLUID STREAM
Filed Oct. 25, 1946          2 SHEETS—SHEET 2
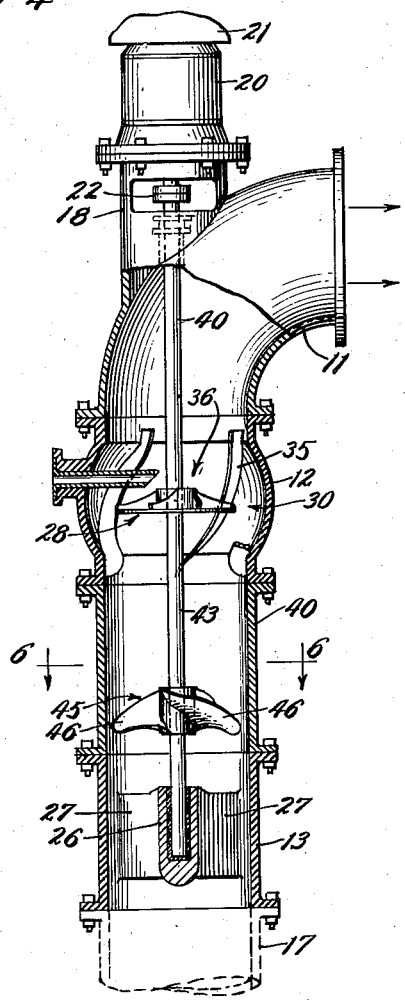
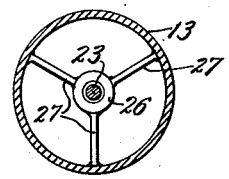
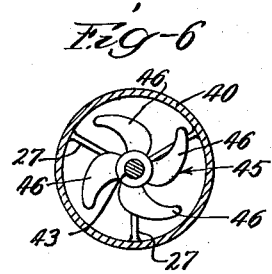
Inventor
James D. Walker Patented Dec. 4, 1951

2,577,095

UNITED STATES PATENT OFFICE 2,577,095

APPARATUS FOR DISPERSING MATERIAL IN A FLUID STREAM

James D. Walker, Aurora, Ill., assignor to The American Well Works

Application October 25, 1946, Serial No. 705,537

4 Claims. (Cl. 261—93)

My invention relates to methods and means for intermixing two materials, at least one of which materials is fluid in character. The materials to be mixed may be of various classes including gases, liquids, finely divided solids, and combinations thereof. While the invention is applicable in various fields for various specific purposes, it is especially advantageous for the introduction of gases, liquids, or finely divided materials into water or sewage liquids. For the purpose of the present disclosure, such an application of the invention will be described.

In the purification of water, suitable materials in solid, liquid, or gaseous form are commonly added for such purposes as regulating the acidity or alkalinity of the water, killing bacteria in the water, precipitating hardness-causing constituents, and reacting with ingredients in the water to form gelatinous precipitates, which precipitates act as coagulants to promote sedimentation and to remove suspended matter. The addition of various liquids for these various purposes is well known. An example of the use of a gas is the addition of carbon-dioxide to water for reducing caustic alkalinity. An example of using solid material is the admixing of activated carbon with water to eliminate undesirable tastes or odors.

It is well known that in all such procedures wherein a relatively small quantity of material is added to a relatively large quantity of fluid for the treatment thereof, the effectiveness of the added material depends to a great extent upon the completeness with which it is dispersed in the fluid and the rapidity with which such dispersion is attained. The general object of my invention is to achieve in a mixing process uniform dispersion of the added material in the shortest possible time.

A specific object of the invention is to provide a simple, effective apparatus with but few moving parts that may be readily incorporated in a pipe line or main. In some practices of the invention a further object is to minimize, if not completely compensate for, resistance to flow involved in the dispersion procedure whereby the invention may be incorporated in a pipe line or main without reducing the pressure drop of the stream flowing through the pipe or main. In some instances my invention may actually increase the net pressure head.

In general, these objects are attained by restricting a stream of material in the passage means to an outer peripheral zone of reduced cross-sectional area, with consequent local acceleration of the stream, drawing off a portion of the stream issuing from said zone, adding the desired material to the drawn-off portion, and redirecting the augmented drawn-off portion centrifugally toward the peripheral zone with consequent violent turbulence in the peripheral zone, which turbulence results in exceedingly rapid dispersion of the added material. In the preferred practice of the invention, axial rotation in the peripheral zone is blocked for promoting the desired turbulence. In some practices of the invention a pump means is incorporated to compensate at least in part for the resistance to flow incidental to the mixing operation.

Other objects and advantages will be apparent in the following detailed description taken with the accompanying drawings.

In the drawings, which are to be regarded as merely illustrative:

Fig. 1 is a view of a relatively simple embodiment of my invention, the view being partly in side elevation and partly in section;

Fig. 2 is a cross-section taken as indicated by the line 2—2 of Fig. 1;

Fig. 3 is a view similar to Fig. 1, showing a second embodiment of the invention incorporating two mixing stages;

Fig. 4 is a similar view of a third embodiment of the invention incorporating means to compensate for resistance to flow involved in the mixing operation;

Fig. 5 is a cross-section taken as indicated by the line 5—5 of Fig. 1; and

Fig. 6 is a cross-section taken as indicated by the line 6—6 of Fig. 4.

In Fig. 1 numeral 10 generally designates a conduit or passage means through which fluid flows in the direction indicated by the arrows. The passage means 10 may be of various constructions in various practices of the invention, but preferably will be adapted for incorporation in a pipe line or main to serve as a part thereof. While the passage means may be a simple straight casing, it is desirable to have it curved for a change in direction thereby to simplify the problem of actuating moving parts therein by power means outside the casing.

In the particular construction shown in Fig. 1, the passage means 10 comprises three sections, viz: an elbow section 11, an intermediate mixing section 12, and an end section 13. Each of these three sections is provided with suitable radial flanges 15 by means of which the sections may be held together by bolts 16. In similar manner the passage means as a whole may be attached to adjacent parts of a pipe line or main. Such an adjacent part, designated 17, of a pipe line or main is shown in dotted lines in Fig. 1.

The elbow section 11 has an exterior cylindrical extension 18 coaxial with the two sections 12 and 13, on which extension is mounted a suitable motor 20. In some installations the motor 20 may be attached to overhead structure 21 for support of the whole apparatus. The motor 20 is connected by a suitable coupling 22 with a shaft 23 that extends through a suitable packing gland 25 into the interior of the passage means. As shown in the drawing, the shaft 23 extends along the axis of the two straight sections 12 and 13, and is seated at its inner end in a suitable bearing 26 in the section 13. As shown in Figs. 1 and 5, the bearing 26 is an integral part of the section 13, being connected with the cylindrical wall of the section by three longitudinal wings 27.

Mounted on the driven shaft 23 in section 12 is a rotary means or diffusion impeller 28 which is of smaller diameter than the surrounding wall of the section to form therewith an outer or peripheral annular zone 30. Preferably the mixing section 12 is expanded or bowl-shaped in configuration, as shown in the drawing, with the peripheral zone 30 at the transverse plane of maximum diameter.

The diffusion impeller 28 may take various forms in various practices of the invention, but by way of example is here shown as comprising a hub 31, a plurality of blades 32 extending outward from the hub toward the peripheral zone 30, and a disc or circular plate 33 unitary with the blades 32 on the upstream side of the impeller. Since the fluid flows upward through the passage means 10, the upstream side of the diffusion impeller is actually the lower side. While the blades 32 of the diffusion impeller may be straight, I prefer the somewhat curved configuration shown in Fig. 2.

Preferably the peripheral zone 30 is provided with suitable means for blocking peripheral rotation of the fluid therein, which blocking means may, for example, comprise a series of fixed blades 35 mounted on the interior of the mixing section 12. It is contemplated that the blades 35, which may be termed fixed diffusion blades, will be positioned generally longitudinally of the mixing section 12, but they may be inclined, as shown in the drawing.

In the mixing operation carried out by the described apparatus, it is essential first, that the upwardly moving stream of water or sewage liquid be diverted into the restricted annular zone 30; second, that a portion of the fluid flowing upward from the peripheral zone be drawn off and redirected to the peripheral zone for recycling; and third, that the material to be added to the water or sewage liquid be added to the drawn-off portion in the course of such recycling.

While the diversion of the upwardly moving stream into the peripheral zone 30 may be accomplished in various ways, I prefer to have this function performed by the diffusion impeller 28. It would seem that the solid wall formed by the disc 33, which functions as a baffle, on the upstream side of the diffusion impeller would be necessary for accomplishing such diversion on the part of the rotary impeller, but the disc may be omitted if the diffusion impeller is rotated at a sufficiently high speed relative to the rate of flow through the apparatus. In other words, in the absence of the disc 33 the rapidly rotating impeller blades 32 will divert the upstreaming fluid to the peripheral zone 30 with almost the same abruptness as would the disc 33.

The recycling of the portion of the fluid issuing from the peripheral zone 30 is accomplished by centrifugal action. The blades of the diffusion impeller form open passageways on the downstream side of the impeller, and these centrifugal passageways may be regarded as having inlets in a central zone 36 on the downstream side of the impeller and as having outlets directed toward the surrounding peripheral zone 30. It is apparent that the particular construction shown forms a vortex in the fluid on the downstream side of the diffusion impeller, with the "eye" or intake of the vortex in the central zone 36. In effect, the desired recycling of the portion of the fluid is performed by this vortex.

The material to be added to the fluid flowing through the passage means 10 in the course of the described recycling of the portion of fluid may be introduced in any suitable manner. In the preferred practice of my invention illustrated by the drawings, the added material is introduced through a nozzle 37 that extends radially into the mixing section 12 to terminate in the central zone 36. The nozzle is shown mounted in a suitable flanged pipe connection 38 that is formed integral with the wall of the mixing section 12.

The operation of the described apparatus may be readily understood from the foregoing description and discussion. The upflowing stream of fluid to be treated is restricted to the annular zone 30, with consequent acceleration of its velocity in that zone. As the upflowing fluid issues from the peripheral zone 30 a portion is drawn inward by virtue of the reduced pressure existing in the central zone 36, and the drawn-off portion is thrown centrifugally outwardly toward the peripheral zone by the diffusion impeller 28. The material in gas, liquid or finely divided solid form that is introduced through the nozzle 37 joins the recycled fluid. It is apparent that the outward flow of the centrifugally driven recycled fluid conflicts with the upward flow of the untreated fluid through the peripheral zone 30, and that this conflict will result in such violent and extensive turbulence as to cause the added material to be thoroughly and quickly intermixed with the fluid under treatment. The rotary effect of the centrifugal action tends to cause the fluid in the peripheral zone 30 to rotate, but the fixed diffusion blades 32 oppose such peripheral rotation and thereby further increase the turbulence for further effectiveness in the mixing operation. As a result the added material is thoroughly and uniformly dispersed in the fluid issuing from the elbow section 11.

The diffusion impeller 28 may be rotated in either direction. In the initial practice of the invention it is rotated counterclockwise, as viewed in Fig. 2, and the impeller blades 32 may, therefore, be regarded as swept backward. On the other hand, if the diffusion impeller is rotated clockwise, the blades 32 may be aptly described as curved forwardly at their tips.

As heretofore stated, the fixed diffusion blades 35 extend in a direction generally longitudinal of the passage means 10, and obviously the blades may be strictly longitudinal, if desired. With the diffusion impeller 28 rotating counterclockwise, as contemplated in the initial practice of the invention, the fixed blades 35, when positioned as shown in Fig. 1, are inclined in such manner as to oppose the advance of the fluid through the mixing section 12. That is to say, any counter-clockwise peripheral rotation of the fluid in the outer peripheral zone 30, in response to the counterclockwise rotation of the diffusion impeller 28, will be in such rotary direction relative to the inclined direction of the fixed blades 35 as to result in a tendency of the fluid to be thrown back through the peripheral zone 30, counter to the prevailing direction of the fluid flow. This tendency to flow backward is, of course, overcome by the stronger tendency for the fluid to progress through the passage means 10, but the reverse tendency is, nevertheless, a factor that further promotes turbulence where violent turbulence is desired for rapid and thorough intermixture.

It is to be understood that the fixed diffusion blades 35 may be inclined opposite from the manner shown in the drawings with respect to the direction of rotation of the diffusion impeller 28. In other words, the fixed blades may be so inclined that any rotary response of fluid in the peripheral zone 30 will cause the fluid to advance in the direction of prevailing flow. In such an arrangement the fixed blades 35 would serve their primary function and adequate turbulence would be engendered in the mixing section 12; but the inclination of the blades would be such as to favor longitudinal flow through the apparatus.

The second embodiment of the invention illustrated in Fig. 3 is largely similar in construction to the first described embodiment, as indicated by the employment of corresponding numerals to indicate corresponding parts. The distinction over the first described construction is that Fig. 3 incorporates two successive mixing sections 12 instead of a single section. Each of the sections 12 has one of the previously mentioned nozzles 37 for the introduction of material to treat the main stream of fluid floating through the apparatus, and the two nozzles may be employed either for adding the same material to the main stream or for adding two materials successively. The two diffusion impellers 28 are mounted on a shaft 39 in the manner heretofore described.

The third embodiment of the invention shown in Fig. 4 is also largely similar to the first described embodiment, as indicated by the use of corresponding numerals to identify corresponding parts. The new feature in Fig. 4 is the addition of pump means upstream from the mixing section 12 for the purpose of at least partly compensating for the resistance to longitudinal flow through the apparatus involved in the described mixing operation.

In Fig. 4 a straight section 40 is interposed between the previously described mixing section 12 and the previously described end section 13. A shaft 43, corresponding to the previously mentioned shaft 23, extends axially through the three sections 12, 40 and 13, and, in the manner heretofore described, is seated in the bearing 26 in the section 13. On the shaft 43 is mounted the previously described diffusion impeller 28 in the mixing section 12, and likewise mounted on the shaft is a pumping impeller 45, the pumping impeller being on the upstream side of the peripheral zone 30.

Since it is contemplated that the shaft 43 will rotate counterclockwise as viewed in Figs. 5 and 6, its blades 46 are inclined in the manner shown in Fig. 4 to boost the upward flow of fluid in the apparatus. The longitudinal wings 27 that support the bearing 26 have a function in the pumping operation, since they serve to direct the upward flowing liquid toward the pumping impeller 45 and prevent peripheral rotation of the fluid below the pumping impeller.

It is apparent that the pumping impeller 45, in adding kinetic energy to the upwardly flowing stream, may compensate to any degree desired for the resistance to flow involved in the mixing operation. In fact, by virtue of the boosting effect of the pumping impeller 45 the incorporation of the apparatus in a pipe line or main may actually increase the pressure head therein.

My description in specific detail herein of illustrative embodiments of the invention will suggest to those skilled in the art various changes and substitutions under the basic concept, and I reserve the right to all such departures from the disclosure that lie within the scope of my appended claims.

I claim as my invention:

1. In apparatus for dispersing a material in a fluid stream flowing in a given axial direction under the influence of a hydrostatic head, the combination of a conduit section through which the stream is forced by said head, baffle means mounted in said section and forming with the walls thereof an annular peripheral zone through which substantially the entire stream must flow, a centrifugal impeller mounted in said conduit section closely adjacent to the baffle means, said impeller having a hub and a plurality of blades radiating therefrom on the downstream side of said baffle means, means for driving said impeller whereby fluid on the downstream side of the baffle means is recycled by being drawn inwardly from the annular zone and is then moved in an upstream direction to said hub of the impeller where it is forced by said blades radially outwardly against the stream of fluid passing through said annular zone and substantially at right angles thereto, and means for adding said material to said recycled portion of the stream.

2. In apparatus for dispersing a material in a fluid stream flowing in a given axial direction under the influence of a hydrostatic head, the combination of a conduit section through which the stream is forced by said head, baffle means mounted in said section and forming with the walls thereof an annular peripheral zone through which substantially the entire stream must flow, a centrifugal impeller mounted in said conduit section closely adjacent to the baffle means, said impeller having a hub and a plurality of blades radiating therefrom on the downstream side of said baffle means, means for driving said impeller whereby fluid on the downstream side of the baffle means is recycled by being drawn inwardly from the annular zone and is then moved in an upstream direction to said hub of the impeller where it is forced by said blades radially outwardly against the stream of fluid passing through said annular zone and substantially at right angles thereto, a series of fixed diffusion blades disposed in said conduit between the peripheral edge of the impeller and the surrounding wall of the conduit for inhibiting peripheral rotation of the fluid in the annular zone, and means for adding said material to said recycled portion of the stream.

3. In apparatus for dispersing a material in a fluid stream flowing in a given axial direction under the influence of a hydrostatic head, the combination of a straight conduit section through which the stream is forced by said head and a curved or elbow conduit section through which the stream is thereafter passed, baffle means mounted in said straight section and forming with the walls thereof an annular peripheral zone through which substantially the entire stream must flow, a centrifugal impeller mounted in said straight conduit section closely adjacent to the baffle means and on the downstream side thereof, said impeller having a hub and a plurality of blades radiating therefrom, driving means for the impeller including a motor mounted on the elbow section in axial alignment with the impeller, a drive shaft extending from the motor to the impeller and passing through the elbow section, said impeller being constructed and arranged whereby fluid on the downstream side of the baffle means is recycled by being drawn inwardly from the annular zone and then moved in an upstream direction to said hub of the impeller where it is forced by said blades radially outwardly against the stream of fluid passing through said annular zone, and means for adding said material to said recycled portion of the stream.

4. In apparatus for dispersing a material in a fluid stream, a composite length of conduit through which the stream is adapted to be passed under the influence of a hydrostatic head, said conduit including a straight conduit section and an elbow section joined thereto, a centrifugal impeller mounted within the straight section for rotation along the axis thereof and constituting an obstruction to the flow of fluid through said conduit, said impeller forming with the walls of said straight section an annular zone through which substantially the entire stream must pass in moving toward the elbow section under the influence of said hydrostatic head, said impeller comprising a hub and a plurality of blades radiating therefrom whereby when the impeller is rotated the fluid is drawn from the annular zone on the downstream side of the impeller and forced radially outwardly by said blades into turbulent engagement with, and substantially at right angles to, the fluid passing through said annular zone, means for introducing said material for admixture with the stream into the fluid withdrawn from the annular zone prior to said engagement with the fluid flowing through the annular zone, and means for driving said impeller, said means including a motor mounted on said elbow section in axial alignment with the straight section and a shaft extending through said elbow section between the motor and said impeller.

JAMES D. WALKER.

REFERENCES CITED

The following references are of record in the file of this patent:

UNITED STATES PATENTS

| Number | Name | Date |
|---|---|---|
| 1,765,338 | Jones et al. | June 17, 1930 |
| 1,809,033 | Hargreaves | June 9, 1931 |
| 2,063,301 | Durdin, Jr. | Dec. 8, 1936 |
| 2,308,751 | Guthrie et al. | Jan. 19, 1943 |
| 2,313,654 | MacLean | Mar. 9, 1943 |

FOREIGN PATENTS

| Number | Country | Date |
|---|---|---|
| 189,076 | Great Britain | Nov. 23, 1922 |
| 449,091 | Germany | Sept. 1, 1927 |